(12) United States Patent
Yamazaki

(10) Patent No.: US 8,287,300 B2
(45) Date of Patent: Oct. 16, 2012

(54) TERMINAL BOX FOR SOLAR CELL MODULE

(75) Inventor: Masakazu Yamazaki, Yao (JP)

(73) Assignee: Hosiden Corporation, Osaka (JP)

( * ) Notice: Subject to any disclaimer, the term of this patent is extended or adjusted under 35 U.S.C. 154(b) by 65 days.

(21) Appl. No.: 12/957,643

(22) Filed: Dec. 1, 2010

(65) Prior Publication Data

US 2011/0136395 A1    Jun. 9, 2011

(30) Foreign Application Priority Data

Dec. 3, 2009  (JP) ................. 2009-275572

(51) Int. Cl.
*H01R 11/20* (2006.01)
*H01R 4/24* (2006.01)
*H01R 4/26* (2006.01)

(52) U.S. Cl. ........................................ 439/441
(58) Field of Classification Search ............ 439/441
See application file for complete search history.

(56) References Cited

U.S. PATENT DOCUMENTS

| | | | |
|---|---|---|---|
| 2,617,844 A * | 11/1952 | Sanda .................. | 439/441 |
| 7,704,095 B2 * | 4/2010 | Stromiedel .......... | 439/441 |
| 7,955,118 B2 * | 6/2011 | Ishida et al. ......... | 439/441 |
| 2010/0170716 A1 | 7/2010 | Ishida et al. | |

FOREIGN PATENT DOCUMENTS

| | | |
|---|---|---|
| JP | 2000133830 A | 5/2000 |
| WO | 2009081508 A1 | 7/2009 |

* cited by examiner

*Primary Examiner* — Javaid Nasri
(74) *Attorney, Agent, or Firm* — The Webb Law Firm

(57) ABSTRACT

A terminal box for a solar cell module includes a box body 2 defining an output terminal introducing hole 7 capable of introducing an output terminal of the solar cell module, and a terminal plate 5 for providing electrical connection between the output terminal introduced through the output terminal introducing hole and an input terminal 4 of an output cable 3. There is provided a pressing piece 12 as an extension from the terminal plate, the pressing piece 12 allowing the output terminal introduced through the output terminal introducing hole to be pressed against the plate face of the terminal plate.

4 Claims, 4 Drawing Sheets

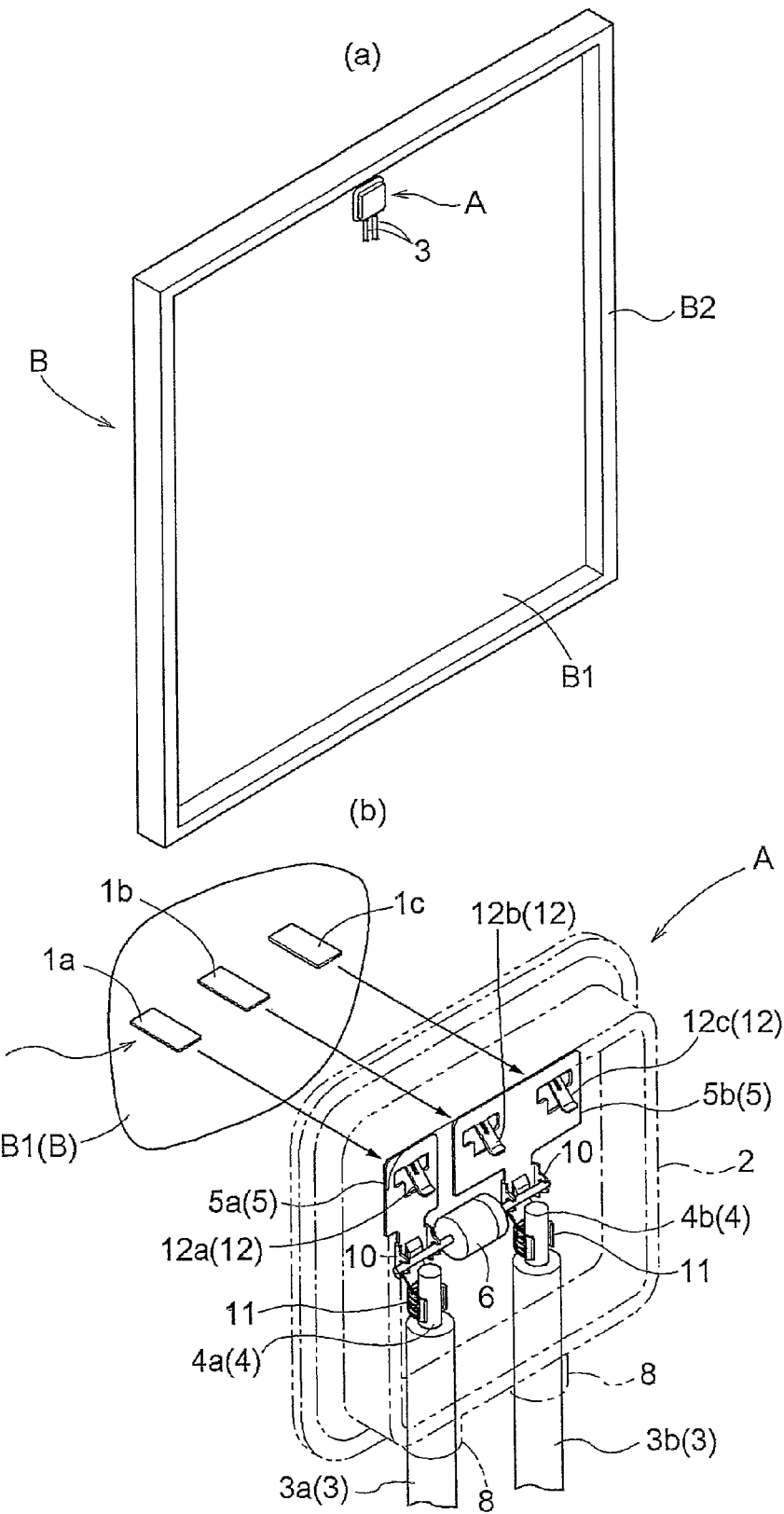
[Fig.1]

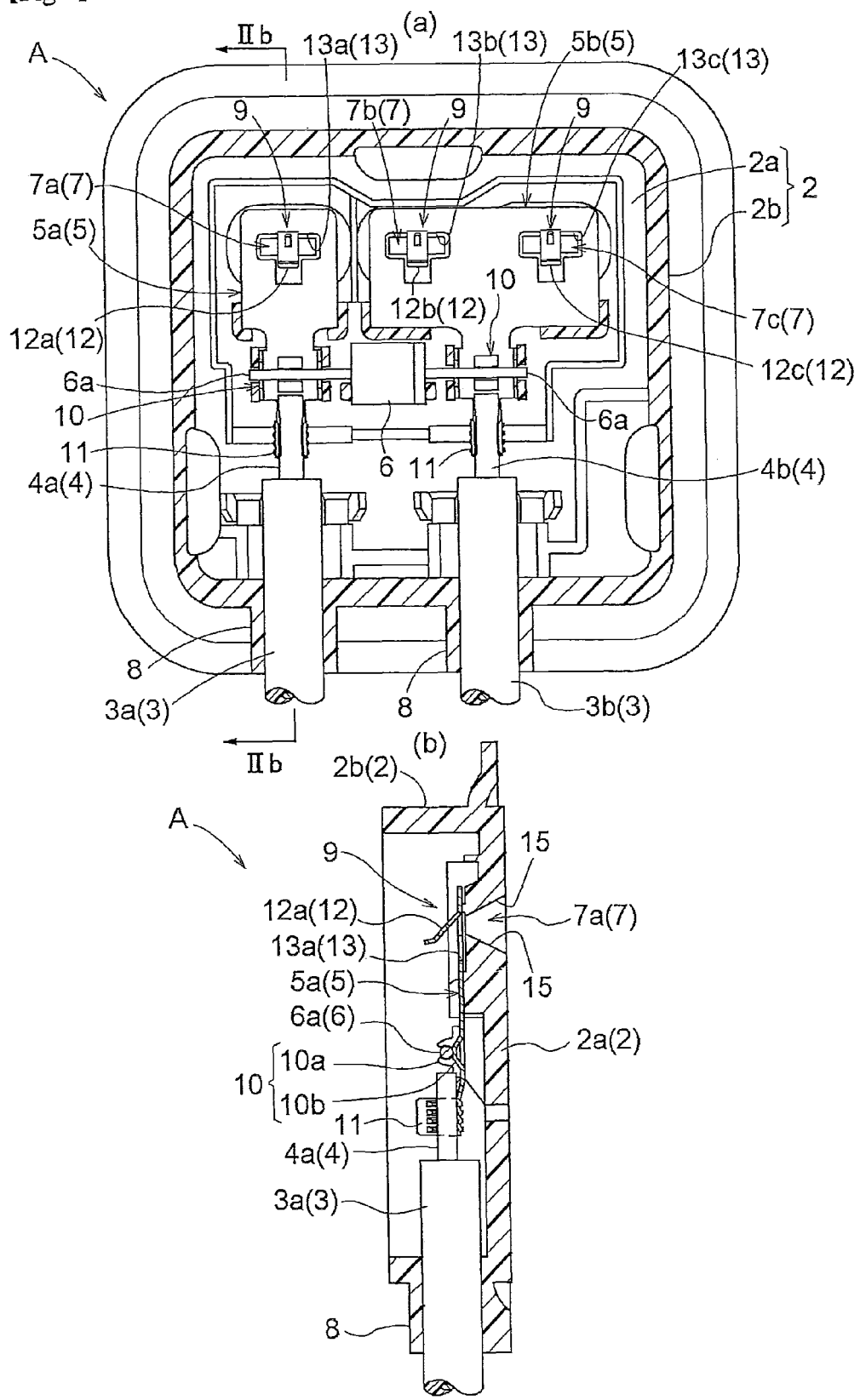
[Fig.2]

[Fig.3]
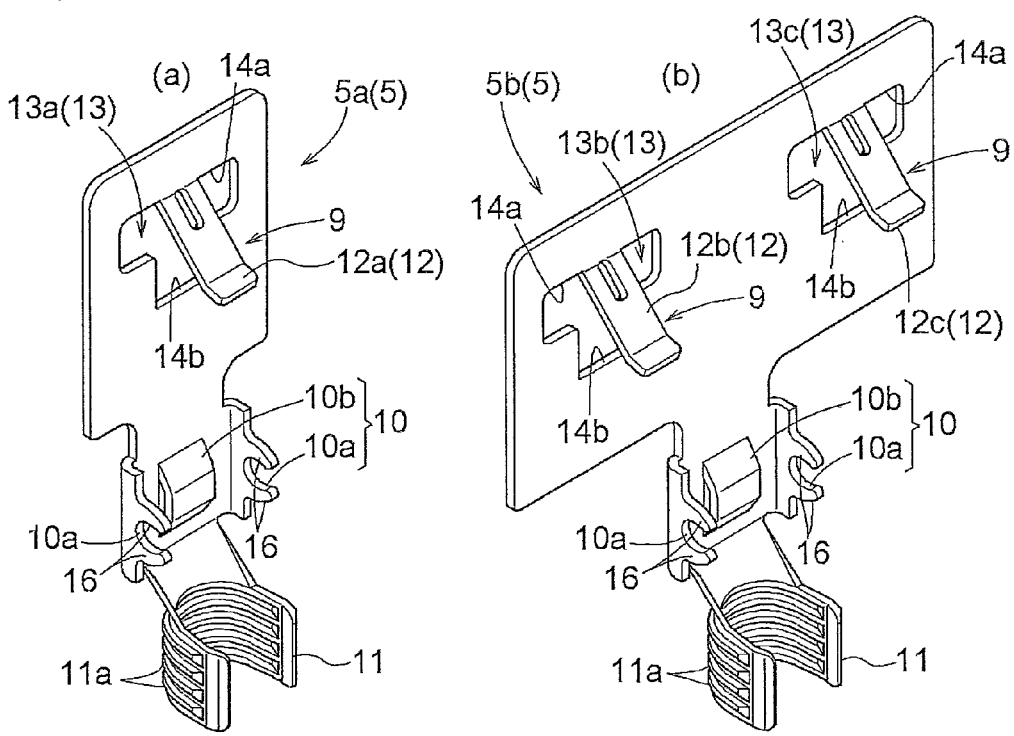
[Fig.4]
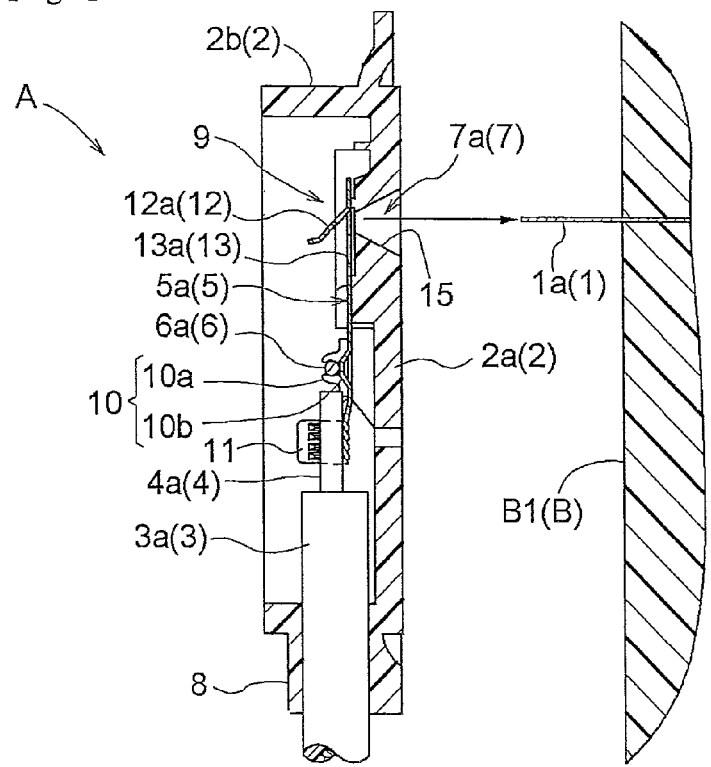

[Fig.5]
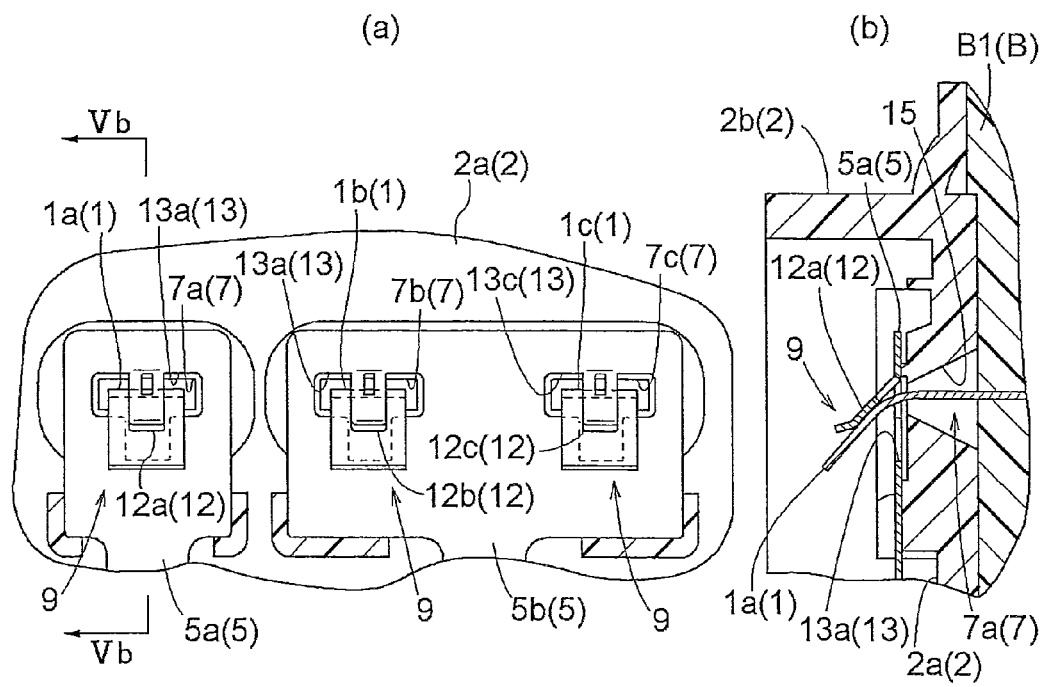
[Fig.6]
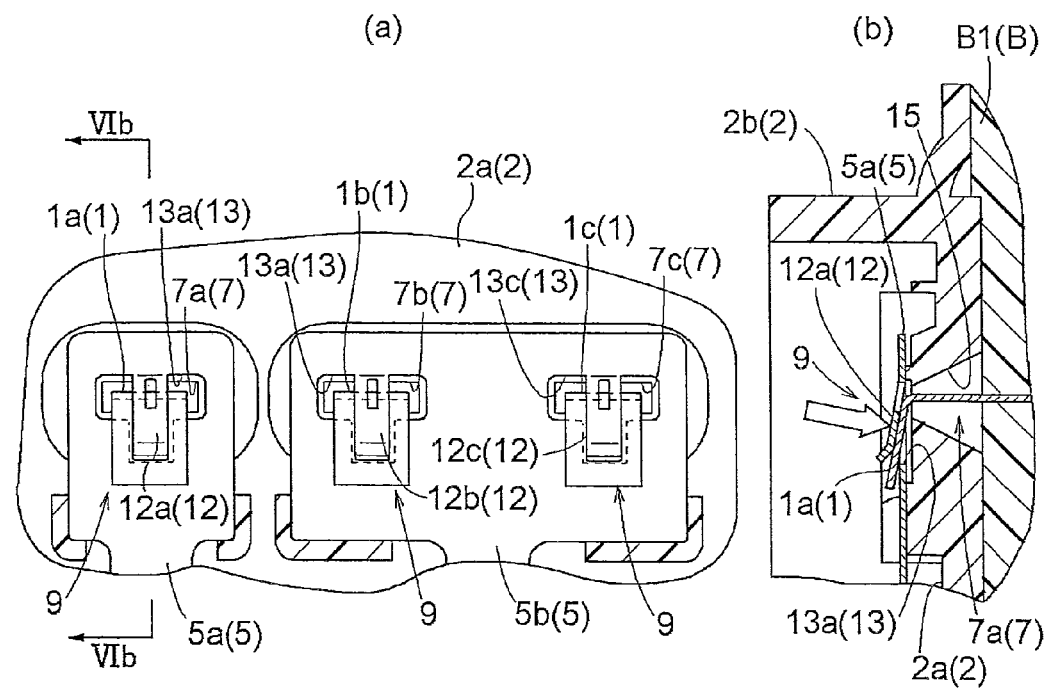

TERMINAL BOX FOR SOLAR CELL MODULE

TECHNICAL FIELD

The present invention relates to a terminal box for a solar cell module, including a box body defining an output terminal introducing hole capable of introducing an output terminal of the solar cell module, and a terminal plate for providing electrical connection between the output terminal introduced through the output terminal introducing hole and an input terminal of an output cable.

BACKGROUND ART

With the terminal box for a solar cell module described above, for providing electric connection between the output terminal and the terminal plate by means of soldering, screw fastening, etc., it is needed to fixedly position the output terminal introduced through the output terminal introducing hole so that the output terminal may be placed in opposition to the plate face of the terminal plate.

According to one known solar cell module terminal box, a slit is defined in the terminal plate and the output terminal is engaged in this slit and then bent over. Or, a constricted portion is formed on the terminal plate and the output terminal is wound around this constricted portion. With these arrangements, the output terminal can be fixed in position to face the plate face of the terminal plate (see e.g. FIGS. 4-6 of Patent Document 1). There is also known a terminal box wherein a positioning member separate from the terminal plate is provided in the box body and the output terminal is engaged with this positioning member to be brought into opposition to the plate face of the terminal plate (see, e.g. FIGS. 7 and 8 of Patent Document 1).

PRIOR ART DOCUMENT

Patent Document

[Patent Document 1] Japanese Patent Application "Kokai" No. 2000-133830

SUMMARY OF THE INVENTION

Problems to be Solved by Invention

For allowing fixing the output terminal in position to face the plate face of the terminal plate, the arrangement of defining a slit in the terminal plate requires operations of engaging the output terminal in the slit and then bending over the engaged output terminal. The arrangement of forming a constricted portion requires the operation of winding the output terminal about this constricted portion. Hence, either arrangement has the shortcoming of requiring troublesome operation(s).

Further, in either case above, for enabling engaging the output terminal in the slit and then bending it over or for enabling winding of the terminal about the constricted portion, the length of the output terminal to be introduced into the box body needs to be long. Hence, both the arrangements suffer the shortcoming of requiring troublesome operation(s) in this respect also.

On the other hand, the arrangement of providing a positioning member separate from the terminal plate in the box body suffers the shortcoming of complicating the construction of the box body.

The present invention has been made in view of the above-described state of the art. The principal object of the present invention is to provide a terminal box for a solar cell module, which allows positioning of the output terminal in opposition to the plate face of the terminal plate, with a simple operation and without involving complication of the construction of the box body.

Means for Accomplishing the Object

According to a first characterizing feature of the present invention, there is proposed a terminal box for a solar cell module, including a box body defining an output terminal introducing hole capable of introducing an output terminal of the solar cell module, and a terminal plate for providing electrical connection between the output terminal introduced through the output terminal introducing hole and an input terminal of an output cable;

wherein there is provided a pressing piece as an extension from the terminal plate, said pressing piece allowing the output terminal introduced through the output terminal introducing hole to be pressed against the plate face of the terminal plate.

With the solar cell module terminal box having the above-described construction, the fixedly positioning operation of the output terminal introduced through the output terminal introducing hole can be accomplished by simply pressing this output terminal against the plate face of the terminal plate with using the pressing piece.

Therefore, the operation of fixedly positioning the output terminal in opposition to the plate face of the terminal plate can be accomplished with the simple operation and without involving complication of the box body construction.

According to the second characterizing feature of the present invention, said pressing piece is configured to be pressed for bending the output terminal toward the plate face of the terminal plate.

With the above-described construction, the fixedly positioning of the output terminal is possible by bending this terminal toward the plate face of the terminal plate with the pressing member. Therefore, it is possible to prevent positioning error or displacement in the longitudinal direction of the output terminal placed in opposition to the plate face of the terminal plate through the engagement between the bent portion with the terminal plate.

According to the third characterizing feature of the present invention, said pressing piece is provided as an extension with its leading end extending progressively away from the side of the terminal plate and said pressing piece is plastically displaceable toward the side of the terminal plate.

With the above-described construction, as the pressing piece is provided as an extension with its leading end extending progressively away from the side of the terminal plate, the output terminal can be readily introduced from the gap between the terminal plate and the pressing piece.

Further, by an operation of plastically displacing the pressing piece toward the side of the terminal plate, the output terminal can be fixed in position with a desired posture and/or distance in opposition to the plate face of the terminal plate.

According to the fourth characterizing feature of the present invention, said terminal plate defines therethrough an output terminal inserting through hole for inserting the output terminal.

With the above-described construction, by inserting the output terminal into the output terminal inserting through hole, it is possible to prevent positional error in the radial or width direction of the output terminal placed in opposition to the plate face of the terminal plate.

According to the fifth characterizing feature of the present invention, said pressing piece extends from an edge portion surrounding said output terminal inserting through hole.

With the above-described construction, when the output terminal inserting through hole is to be punched out in the terminal plate, this punching operation can be carried out in such a manner that the pressing piece may extend from the edge portion surrounding the output terminal inserting through hole. Hence, the pressing piece can be formed in an efficient manner.

According to the sixth characterizing feature of the present invention, in an inner peripheral face of said output terminal introducing hole, there is formed a guide face for guiding the insertion of the output terminal into the output terminal inserting through hole.

With the above-described construction, as the output terminal is to be introduced through the output terminal introducing hole, this insertion operation of the output terminal into the output terminal introducing hole can be guided effectively.

Therefore, the operation of inserting the output terminal into the output terminal inserting through hole can be facilitated.

BRIEF DESCRIPTION OF THE DRAWINGS

FIG. 1 (a) is a perspective view showing a solar cell module, (b) is a perspective view showing an output terminal and a terminal box.

FIG. 2 (a) is a plane view showing the inside of the terminal box, (b) is a section view taken along a line IIb-IIb in FIG. 2 (a).

FIGS. 3 (a) and (b) are perspective views of terminal plates.

FIG. 4 is a section view showing the terminal box placed in opposition to the solar cell body.

FIG. 5 shows a condition of the terminal box being bonded to the solar cell body, (a) is a plane view showing the inside of the terminal box and (b) is a section view taken along a line Vb-Vb in FIG. 5 (a).

FIG. 6 shows a condition of the output terminal fixed in position relative to the terminal plate, (a) is a plane view showing the inside of the terminal box and (b) is a section view taken along a line VIb-VIb in FIG. 6 (a).

MODES OF EMBODYING THE INVENTION

Next, embodiments of the present invention will be described with reference to the accompanying drawings.

As shown in FIG. 1 (a), a solar cell module B to which a solar cell module terminal box A according to the present invention (to be referred to as the "terminal box" hereinafter) is connected, includes a rectangular-shaped solar cell body B1 mounting a number of solar cells (not shown) in juxtaposition and a frame body B2 sealing the outer periphery of the solar cell body B1.

As shown in FIG. 1 (b), three output terminals 1 (1a, 1b, 1c) in the form of band plates are caused to extend substantially perpendicularly from the back face of the solar cell body B1, with these three output terminals 1a, 1b, 1c being arranged along the band plate face to be connected with the terminal box A.

As shown in FIG. 2, the terminal box A includes a box body 2 made of resin, two terminal plates 5 (5a, 5b) formed of conductive metal for establishing electric connection between the output terminals 1 of the solar cell module B and input terminals 4 (4a, 4b) of output cables 3 (3a, 3b) and a bypass diode 6 electrically connected between the two terminal plates 5a, 5b.

The two terminal plates 5a, 5b are provided respectively in correspondence with the pair of output cables 3a, 3b.

The box body 2 integrally includes an approximately square-shaped bottom plate portion 2a and a peripheral wall portion 2b formed along the outer periphery of the bottom plate portion 2a. The bottom plate portion 2a defines three output terminal introducing holes 7 (7a, 7b, 7c) capable of respectively introducing the three output terminals 1a, 1b, 1c. These output terminal introducing holes 7a, 7b, 7c are provided as holes elongated along the lateral width direction of the band-plate like output terminals 1. The peripheral wall portion 2b forms two bosses 8 for respectively introducing and retaining the terminal ends of the pair of output cables 3a, 3b.

As shown in FIG. 3, each one of the two terminal plates 5a, 5b includes integrally an approximately rectangular plate like output terminal connecting portion 9 to which the output terminal 1 is electrically connected by soldering, a diode connecting portion 10 to which the bypass diode 6 is electrically connected and an input terminal connecting portion 11 to which the input terminal 4 of the output cable 3 is electrically connected.

Each one of the terminal plates 5a, 5b includes, as an extension thereof, a pressing piece 12 (12a, 12b, 12c) capable of pressing the output terminal 1a, 1b, 1c introduced through the output terminal introducing hole 7a, 7b, 7c toward the plate face of the terminal plate 5a, 5b.

FIG. 3 (a) shows one terminal plate 5a to which the input terminal 4a of one output cable 3a is connected. The output terminal connecting portion 9 of this terminal plate 5a defines therethrough an output terminal inserting through hole 13 (13a) for inserting the output terminal 1a inserted through the output terminal introducing hole 7a, so that the one output terminal 1a inserted through this output terminal inserting through hole 13a is electrically connected to the plate.

FIG. 3 (b) shows the other terminal plate 5b to which the input terminal 4b of the other output cable 3b is connected. The output terminal connecting portion 9 of this terminal plate a defines two output terminal inserting through holes 13 (13b, 13c) for respectively inserting the two output terminals 1b, 1c inserted respectively through the output terminal introducing holes 7b, 7c, so that the two output terminals 1b, 1c respectively inserted through these output terminal inserting through holes 13b, 13c are electrically connected to the terminal plate 5b.

Each one of the output terminal inserting through holes 13, as shown in FIG. 3, includes a wide hole portion 14a formed wider than the terminal width of the output terminal 1 and a narrow hole portion 14b formed narrower than the terminal width of the output terminal 1. The output terminal inserting through hole 13, as a whole, is formed in a T-shaped form with the terminal end of the narrow hole portion 14b extending continuously from the width-wise center portion of the wide hole portion 14a.

The terminal plate 5 is secured to the box body 2 in such a manner that the wide hole portion 14a may be arranged coaxially with the output terminal introducing hole 7 corresponding thereto.

Each one of the output terminal introducing holes 7 forms, in its inner peripheral face, a guide face 15 for guiding the insertion of the output terminal 1 into the wide hole portion 14a of the output terminal inserting through hole 13 in association with the introduction of the output terminal 1 into the output terminal introducing hole 7 with the bottom plate portion 2a placed in opposition to the back face of the solar cell body B1.

The guide face 15, as shown in FIG. 5, is formed with inner peripheral faces extending along the width direction of the output terminal 1 on the front and back sides of the inner peripheral face of the output terminal introducing hole 7 being formed closer to each other toward the exit side. Each output terminal 1 introduced though the output terminal introducing hole 7 is inserted and guided into the wide hole portion 14a of the output terminal inserting through hole 13 and then overlapped with the terminal plate portion surrounding the narrow hole portion 14b and soldered to the terminal plate 5 under this condition.

As shown in FIG. 3, the pressing piece 12 extends from a portion of the edge portion of terminal plate 5 that surrounds the wide hole portion 14a and is in opposition to the narrow hole portion 14b, with the leading end thereof being inclined progressively away from the terminal plate 5, so that the pressing piece 12 is plastically displaceable toward the terminal plate 5, about its connected portion connected to the terminal plate 5 as the pivot.

The output terminal 1, as shown in FIG. 4, is inserted through the output terminal introducing hole 7 and the output terminal inserting through hole 13 to the inside of the box body 2 along the direction normal to the plate face of the terminal plate 5.

Therefore, as the output terminal 1 is introduced into the box body 2, the output terminal 1 comes into contact with the pressing piece 12, whereby the output terminal 1 is bent, by the plate face of the pressing piece 12, toward the plate face of the terminal plate 5, as shown in FIG. 5. With an operation for plastically displacing the pressing piece 12 toward the plate face of the terminal plate 5, as shown in FIG. 6, the output terminal 1 will be forcibly bent toward the plate face of the terminal plate 5, thus being pressed thereby and fixed in position (temporary fixing).

The diode connecting portion 10, as shown in FIG. 3, includes a pair of right and left holding portions 10a for holding a shaft-like connecting terminal 6a of the bypass diode 6 and a terminal receiving portion 10b formed as a bulged portion of the terminal plate between the pair of holding portions 10a. As the shaft-like connecting terminal 6a is placed in pressed contact with the holding portions 10a and the terminal receiving portion 10b, the bypass diode 6 is electrically connected to the terminal plate 5.

The holding portions 10a plastically deforms a pair of holding pieces 16 closer to each other, with the shaft-like connecting terminal 6a being inserted between these holding pieces 16. With this, the shaft-like connecting terminal 6a can be held as being in pressed contact with the upper faces of the terminal receiving portions 10b.

The input terminal connecting portion 11 includes a semi-cylindrical holding cylinder portion 11a. As the input terminal 4 of the output cable 3 is inserted into the holding cylinder portion 11a and then with a caulking operation, this holding cylinder portion 11a will be plastically deformed in the diameter reducing direction, whereby the input terminal 4 becomes electrically connected with the terminal plate 5.

FIGS. 4 through 6 illustrate a connecting procedure of connecting the terminal plate 5 of the terminal box A to the output terminals 1 of the solar cell module B.

As shown in FIG. 4, the terminal box A will be held such that the bottom face of the terminal box A may be in approximately parallel opposition to the back face of the solar cell body B1 and each output terminal introducing hole 7 may be placed in opposition to the leading end of the output terminal 1 corresponding thereto.

Next, the bottom face of the terminal box A will be pressed against the back face of the solar cell body to be adhesively bonded thereto and each output terminal 1 will be inserted into the corresponding output terminal introducing hole 7 to be guided to the inside of the box body 2.

In the course of the above, as the output terminal 1 penetrates through the output terminal introducing hole 7, the output terminal 1 comes into contact with the pressing piece 12, whereby the output terminal 1 will be bent along the plate face of the pressing piece 12 toward the plate face of the terminal plate 5, as illustrated in FIG. 5.

Next, each pressing piece 12 will be pressed with a finger or the like to be plastically deformed and displaced toward the side of the terminal plate 5, whereby the output terminal 1 will be forcibly bent toward the plate face of the terminal plate 5, while this output terminal 1 will be pressed toward the plate face of the terminal plate 5. With this, as illustrated in FIG. 6, each output terminal 1 will be fixedly positioned (temporary fixing) in opposition to the plate face of the terminal plate 5.

Thereafter, though not shown, the output terminal 1 will be soldered to the terminal plate 5, thereby to electrically connect the terminal plate 5 to the output terminal 1 and then an amount of silicon resin or the like will be charged and a lid or the like will be fitted thereon, if needed.

OTHER EMBODIMENTS

1. In the terminal box of the present invention, the pressing piece can be provided as an elastically deformable/displaceable extension from the terminal plate. In this case, as the output terminal is introduced into the box body with forcible elastic deformation/displacement of the pressing piece, elastic resilience of the pressing piece can press the output terminal against the side to the terminal plate.

2. In the terminal box of the present invention, the terminal plate can include, as an extension therefrom, a pressing piece capable of pressing an output terminal in the form of a shaft or a twisted line, toward the plate face of the terminal plate.

3. The terminal box of the present invention can be configured such that electric connection is established by screw-fixing the output terminal to the terminal plate.

DESCRIPTION OF REFERENCE MARKS 1 output terminal
2 box body
3 output cable
4 input terminal
5 terminal plate
7 output terminal introducing hole
12 pressing piece
13 output terminal inserting through hole
15 guide face
B solar cell module

The invention claimed is:
1. A terminal box for a solar cell module, including a box body defining an output terminal introducing hole capable of introducing an output terminal of the solar cell module, and a terminal plate for providing electrical connection between the output terminal introduced through the output terminal introducing hole and an input terminal of an output cable;
wherein there is provided a pressing piece as an extension from the terminal plate, said pressing piece allowing the output terminal introduced through the output terminal introducing hole to be pressed against a plate face of the terminal plate, and wherein said pressing piece is configured to be pressed for bending the output terminal toward the plate face of the terminal plate.

2. A terminal box for a solar cell module, including a box body defining an output terminal introducing hole capable of introducing an output terminal of the solar cell module, and a terminal plate for providing electrical connection between the output terminal introduced through the output terminal introducing hole and an input terminal of an output cable;

wherein there is provided a pressing piece as an extension from the terminal plate, said pressing piece allowing the output terminal introduced through the output terminal introducing hole to be pressed against a plate face of the terminal plate, and wherein said pressing piece is provided as an extension with its leading end extending progressively away from a side of the terminal plate and said pressing piece is plastically displaceable toward the side of the terminal plate.

3. A terminal box for a solar cell module, including a box body defining an output terminal introducing hole capable of introducing an output terminal of the solar cell module, and a terminal plate for providing electrical connection between the output terminal introduced through the output terminal introducing hole and an input terminal of an output cable;

wherein there is provided a pressing piece as an extension from the terminal plate, said pressing piece allowing the output terminal introduced through the output terminal introducing hole to be pressed against a plate face of the terminal plate, wherein said terminal plate defines therethrough an output terminal inserting through hole for inserting the output terminal, and wherein said pressing piece extends from an edge portion surrounding said output terminal inserting through hole.

4. The terminal box for a solar cell module according to claim 3, wherein in an inner peripheral face of said output terminal introducing hole, there is formed a guide face for guiding the insertion of the output terminal into the output terminal inserting through hole.

* * * * *